United States Patent
Bosga et al.

(10) Patent No.: US 10,840,833 B2
(45) Date of Patent: Nov. 17, 2020

(54) HIGH EFFICIENCY COMMUTATION CIRCUIT

(71) Applicant: ABB SCHWEIZ AG, Baden (CH)

(72) Inventors: Sjoerd Bosga, Västerås (SE);
Veli-Matti Leppanen, Helsinki (FI);
Mehanathan Pathmanathan, Västerås (SE); Robert Chin, Västerås (SE);
Yujing Liu, Öjersjö (SE)

(73) Assignee: ABB Schweiz AG, Baden (CH)

( * ) Notice: Subject to any disclaimer, the term of this patent is extended or adjusted under 35 U.S.C. 154(b) by 89 days.

(21) Appl. No.: 15/122,854

(22) PCT Filed: Mar. 31, 2015

(86) PCT No.: PCT/EP2015/056942
§ 371 (c)(1),
(2) Date: Aug. 31, 2016

(87) PCT Pub. No.: WO2015/150349
PCT Pub. Date: Oct. 8, 2015

(65) Prior Publication Data
US 2017/0099019 A1 Apr. 6, 2017

(30) Foreign Application Priority Data
Mar. 31, 2014 (EP) .................................... 14162538

(51) Int. Cl.
*H02P 6/15* (2016.01)
*H02P 6/26* (2016.01)

(52) U.S. Cl.
CPC . *H02P 6/15* (2016.02); *H02P 6/26* (2016.02)

(58) Field of Classification Search
CPC ........... H02P 6/15; H02M 7/00; H02M 7/797; H02M 7/48
(Continued)

(56) References Cited

U.S. PATENT DOCUMENTS 8,884,562 B1 * 11/2014 Cameron, Jr. ............ H02P 6/10
318/400.29
9,252,645 B2 * 2/2016 Crane ..................... H02P 25/22
(Continued)

FOREIGN PATENT DOCUMENTS

DE      3130102 A1      5/1982
DE      3725515 A1 *    2/1989  .............. B60L 9/005
(Continued)

OTHER PUBLICATIONS

International Search Report & Written Opinion of the International Searching Authority Application No. PCT/EP2015/056942 Completed: Jun. 24, 2015; dated Jul. 2, 2015 14 pages.

*Primary Examiner* — Eduardo Colon Santana
*Assistant Examiner* — Said Bouziane
(74) *Attorney, Agent, or Firm* — Whitmyer IP Group LLC

(57) ABSTRACT

A commutation circuit includes a coil connected to an H bridge, the H bridge including four main switches for reversing polarity and a resulting coil current in the coil. The commutation circuit further includes a voltage source configured to generate a bypass current, and at least one auxiliary switch for controlling the bypass current to thereby decrease a switch current through at least one of the main switches. By generating an appropriate bypass current with help of a voltage source, a switch current through a desired main switch in a leading state can be decreased and eventually brought to zero. Zero current in its turn enables the use of thyristors as main switches as it results in the thyristors to be turned off automatically. Furthermore, decreased switch current at the switching moment reduces switching losses even in different types of switches such as GTOs and IGBTs.

19 Claims, 4 Drawing Sheets

(58) Field of Classification Search
USPC ............................................................ 318/1
See application file for complete search history.

(56) References Cited

U.S. PATENT DOCUMENTS

| | | |
|---|---|---|
| 2004/0135529 A1 | 7/2004 | Yoshitomi et al. |
| 2007/0145928 A1* | 6/2007 | Crane ..................... H02P 8/00 318/400.26 |
| 2009/0115363 A1* | 5/2009 | Crane ..................... H02P 6/14 318/400.26 |
| 2011/0062910 A1* | 3/2011 | Tsai ........................ H02P 6/18 318/400.35 |
| 2012/0306471 A1* | 12/2012 | Green ................... H01H 9/542 323/355 |
| 2013/0241368 A1* | 9/2013 | Liu ................... H02K 11/0073 310/68 D |
| 2015/0244284 A1* | 8/2015 | Fu ........................ H02M 7/537 363/41 |

FOREIGN PATENT DOCUMENTS

| | | |
|---|---|---|
| GB | 2431528 A | 4/2007 |
| JP | H1169876 A | 3/1999 |
| JP | 2002209383 A | 7/2002 |
| WO | 03015245 A1 | 2/2003 |
| WO | 2012062376 A1 | 5/2012 |

\* cited by examiner

HIGH EFFICIENCY COMMUTATION CIRCUIT

TECHNICAL FIELD

The present invention relates to a circuit for consecutively reversing a current direction in a coil.

BACKGROUND

Referring to FIG. 1, a conventional commutation circuit 10 comprises an H bridge 20 with four main switches 30, 40, 50, 60. A coil 70 in which the current direction is to be reversed is connected between a first output terminal 80 and a second output terminal 85 of the H bridge 20. A first input terminal 90 and a second input terminal 95 of the H bridge 20 are connected to a current source 100 which provides a constant cell current $I_{DC}$. The four main switches are operated appropriately to make the coil current $I_L$ flow in a desired direction in the coil. For example, according to FIG. 1 a first main switch 30 and a second main switch 40 are closed, and the coil current $I_L$ flows from left to right in the figure (positive direction 290). In order to reverse the coil current $I_L$ to flow from right to left (negative direction 300), a third main switch 50 and a fourth main switch 60 are closed, and the first and the second main switches 30, 40 are opened.

The main switches are typically realized as semiconductor devices. Since the commutation circuit topology of FIG. 1 requires that all the main switches can be actively opened, the respective semiconductor devices need to be of turn-off type i.e. of a type that can be actively turned off. In addition, the semiconductor devices need to have a reverse blocking capability. Examples of such semiconductor devices are symmetrical GTOs and reverse blocking IGBTs. On the other hand, thyristors are not turn-off type semiconductor devices. Therefore, thyristors would not work as main switches in the topology according to FIG. 1 since a thyristor is only turned off when current through it becomes zero or close to zero. However, thyristors have low losses and they are cheap in comparison with the turn-off type semiconductor devices. It would therefore be desirable to enable the use of thyristors as main switches in an H bridge of a commutation circuit.

WO2012/062376 discloses a commutation circuit for reversing a coil current in a coil of an electrical machine. The commutation circuit comprises a capacitor arranged to form a resonant circuit with the coil. The main switches in the H bridges disclosed in WO2012/062376 need to be of turn-off type in order for the commutation to work as described.

SUMMARY

One object of the invention is to provide a commutation circuit which enables the use of thyristors as main switches in an H bridge. A further object of the invention is to provide a commutation circuit with low losses irrespective of what kind of switches are used as main switches in the H bridge.

These objects are achieved by the different features of the present invention.

The invention is based on the realization that by generating an appropriate bypass current with help of a voltage source, a switch current through a desired main switch in a leading state can be decreased and eventually brought to zero. Zero switch current in its turn enables the use of thyristors as main switches as it results in the thyristors to be turned off automatically. Furthermore, decreased switch current at the switching moment reduces switching losses even in different types of switches such as GTOs and IGBTs.

According to a first aspect of the invention, there is provided a commutation circuit comprising a coil connected to an H bridge, the H bridge comprising four main switches for reversing polarity and a resulting coil current in the coil. The commutation circuit further comprises a voltage source configured to generate a bypass current, and at least one auxiliary switch for controlling the bypass current to thereby decrease a switch current through at least one of the main switches. The commutation circuit is configured to decrease the switch current through at least one of the main switches without turning on any of the remaining main switches. The ability to controllably decrease switch currents through the main switches reduces switching losses, and provided that the switch currents are reduced sufficiently also enables the use of thyristors as main switches.

According to one embodiment of the invention, the voltage source is configured to generate a bypass current to thereby bring the switch current to zero. Zero switch current results in thyristors to be turned off automatically in a reliable way.

According to one embodiment of the invention, the voltage source comprises a capacitor. By means of a capacitor the required voltage can be provided in a simple way.

According to one embodiment of the invention, the coil current at least partially results from a cell current generated by a current source, and the cell current is furthermore used to pre-charge the capacitor. When the cell current is used to pre-charge the capacitor no additional pre-charge circuit is needed.

According to one embodiment of the invention, at least one of the main switches comprises a thyristor. A thyristor is a preferred main switch type in a commutation circuit as thyristors are simple, cheap, and have low losses.

According to one embodiment of the invention, all the main switches are thyristors.

According to one embodiment of the invention, all the auxiliary switches are thyristors.

According to one embodiment of the invention, the voltage source is connected in parallel with at least one of the main switches.

According to one embodiment of the invention, the voltage source is connected in series with the coil.

According to one embodiment of the invention, an electrical machine comprises a commutation circuit according to any of the embodiments disclosed hereinbefore.

According to a second aspect of the invention, there is provided a method for reversing a current direction in a coil, the method comprising the steps of: providing a coil connected to an H bridge, the H bridge comprising four main switches; and generating a bypass current and controlling it to thereby decrease a switch current through at least one of the main switches without turning on any of the remaining main switches.

BRIEF DESCRIPTION OF THE DRAWINGS

The invention will be explained in greater detail with reference to the accompanying drawings, wherein.

DETAILED DESCRIPTION

Figure 1:
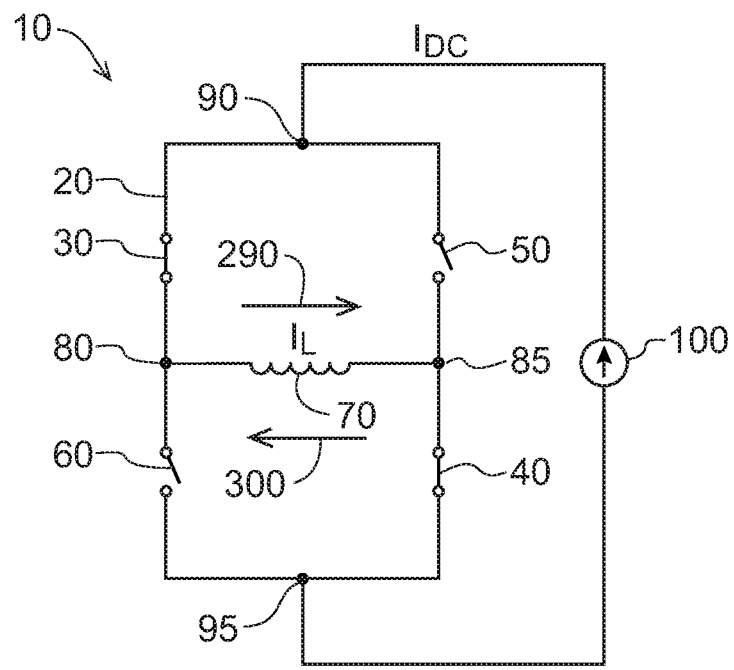
FIG. 1 shows a conventional commutation circuit.

All embodiments of the invention disclosed herein comprise a sub-circuit corresponding to that shown in FIG. 1, the only difference being that at least some of the main switches 30, 40, 50, 60 according to the disclosed embodiments of the invention are realized as thyristors. In the following description the sub-circuit comprising an H bridge 20 with four main switches 30, 40, 50, 60, a coil 70 connected to output terminals 80, 85 of the H bridge 20 and a current source 100 connected to input terminals 90, 95 of the H bridge 20 will be termed as a "cell".

Figure 2:
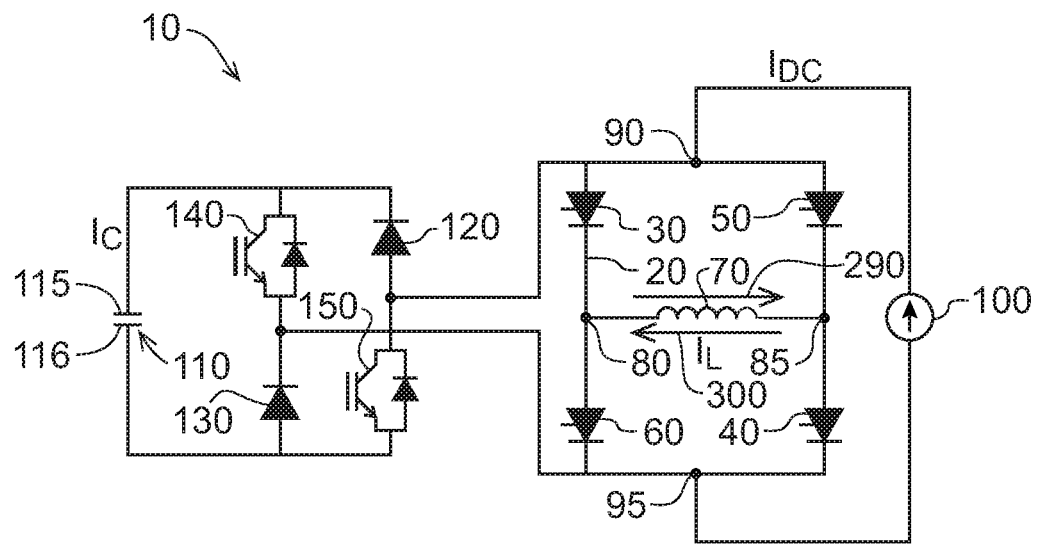
FIG. 2 shows a commutation circuit according to one embodiment of the invention.

Referring to FIG. 2, in addition to the cell comprising four main switches 30, 40, 50, 60 in the form of thyristors, a commutation circuit 10 according to one embodiment of the invention comprises a voltage source in the form of a capacitor 110 connected in parallel with the H bridge 20 via a first diode 120 and a second diode 130. The capacitor 110 has a first terminal 115 and a second terminal 116. The capacitor 110 can furthermore be connected anti-parallel with the H bridge 20 by turning on a first auxiliary switch 140 and a second auxiliary switch 150. According to the embodiment of FIG. 2 the first and second auxiliary switches 140, 150 are IGBTs each provided with an anti-parallel diode.

At an initial state of the commutation circuit 10 the cell current $I_{DC}$ flows through the first main switch 30, the coil 70 and the second main switch 40, the coil current $I_L$ in the coil 70 flowing in a positive direction 290 and being equal with the cell current $I_{DC}$. The capacitor 110 has been charged via the first diode 120 to have a positive polarity on the first terminal 115. The objective of the commutation is to reverse the coil current $I_L$ to flow through the third and fourth main switches 50, 60 and in a negative direction 300 in the coil 70. At a first phase of the commutation the first and second auxiliary switches 140, 150 are turned on, and the capacitor 110 is thereby connected anti-parallel with the H bridge 20. As a consequence, a capacitor current $I_C$ starts to increase, and the coil current $I_L$ starts to decrease. The capacitor 110 shall be dimensioned large enough to bring the coil current $I_L$ to zero, and when this occurs the first and second main switches 30, 40 are turned off automatically as their switch currents (a current through a switch) become zero.

At a second phase of the commutation the first and second auxiliary switches 140, 150 are turned off, and the first input terminal 90 is thereby again brought into contact with the first terminal 115 via the diode 120, while the output terminal 95 is brought into contact with the second terminal 116 via the diode 130. The capacitor 110 starts to recharge positive polarity on the first terminal 115, and the third and fourth main switches 50, 60 are turned on. The turning on of the third and fourth main switches 50, 60 can be delayed in order to control the amount of energy on the capacitor 110 at the end of the commutation. The recharging of the capacitor 110 continues after the turning on of the third and fourth main switches 50, 60, and eventually the energy stored on the capacitor 110 becomes sufficient for the next commutation. The objective of the commutation is now reached, and the commutation circuit 10 is at a state that is identical with the initial state except the fact that the coil current $I_L$ flows in the negative direction 300. A next commutation can now be carried out in a corresponding manner as the commutation just described.

Figure 3:
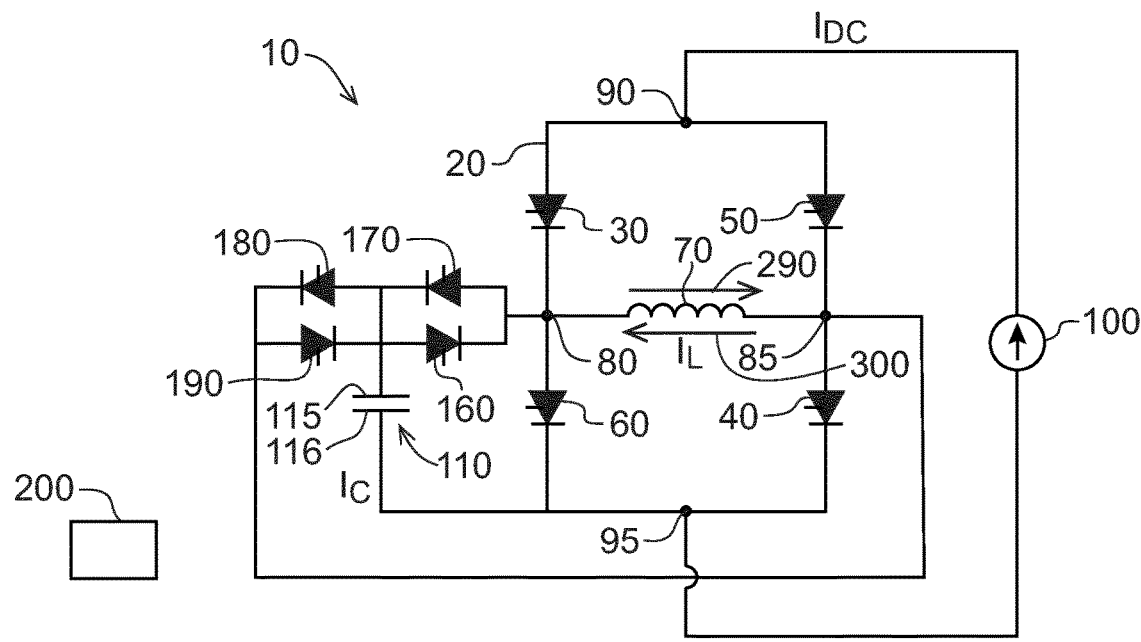
FIG. 3 shows a commutation circuit according to one embodiment of the invention.

Referring to FIG. 3, according to one embodiment of the invention the voltage source in the form of a capacitor 110 is connected either between the first output terminal 80 and the second input terminal 95 or between the second output terminal 85 and the second input terminal 95, depending on the states of a third auxiliary switch 160, a fourth auxiliary switch 170, a fifth auxiliary switch 180 and a sixth auxiliary switch 190. All the main switches 30, 40, 50, 60 and the auxiliary switches 160, 170, 180, 190 are thyristors.

At an initial state of the commutation circuit 10 the coil current $I_L$ flows in a positive direction 290 and is equal with the cell current $I_{DC}$. The capacitor 110 is pre-charged by means of a pre-charge circuit 200 to have a positive polarity on the first terminal 115. The objective of the commutation is to reverse the coil current $I_L$ to flow in a negative direction 300. At a first phase of the commutation the third main switch 50 and the third auxiliary switch 160 are turned on. As a consequence, the first main switch 30 is automatically turned off as a negative voltage is applied over it and the switch current is brought to zero, and the cell is short circuited through the third and second main switches 50, 40.

The capacitor 110 now forms a resonance circuit together with the coil 70, and due to the pre-charge of the capacitor 110 the coil current $I_L$ slightly increases before decreasing to zero as the voltage over the capacitor 110 changes polarity and eventually stores all the energy of the resonance circuit. The fourth auxiliary switch 170 is turned on to allow the resonance to continue, and the coil current $I_L$ starts to increase in the negative direction 300 and eventually becomes equal with the cell current $I_{DC}$. As this occurs the second main switch 40 is automatically turned off, and as soon as the voltage over the capacitor 110 changes polarity the fourth main switch 60 is turned on.

The objective of the commutation is now reached, and the capacitor 110 needs to be pre-charged with the same polarity as initially before a next commutation can be carried out. The commutation just described was carried out by connecting the capacitor 110 between the first output terminal 80 and the second input terminal 95. A next commutation is carried out in a corresponding manner, the only difference being that the capacitor 110 is now connected between the second output terminal 85 and the second input terminal 95 by appropriately operating the fifth and sixth auxiliary switches 180, 190.

Figure 4:
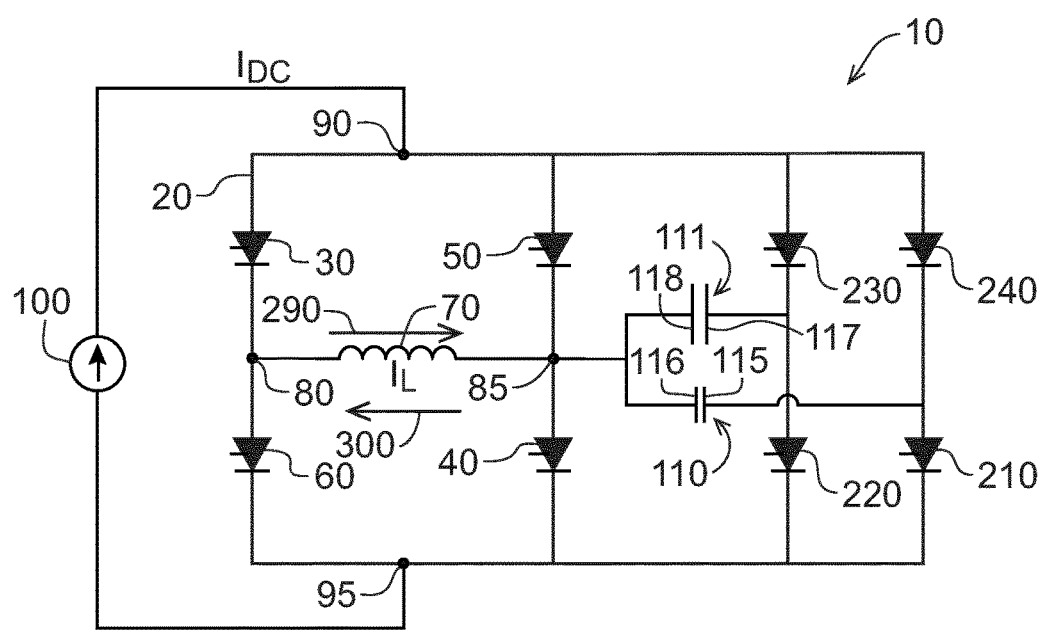
FIG. 4 shows a commutation circuit according to one embodiment of the invention.

Referring to FIG. 4, according to one embodiment of the invention the commutation circuit 10 comprises a voltage source in the form of a combination of a first capacitor 110 and a second capacitor 111. The first capacitor 110 is pre-charged using the cell current $I_{DC}$ (for example by turning on a tenth auxiliary switch 240 and the second main switch 40) to have a positive polarity on a first terminal 115 and a negative one on a second terminal 116. The second capacitor 111 comprises a third terminal 117 and a fourth terminal 118, and it is not pre-charged. The first capacitor 110 needs to be dimensioned to contain sufficient amount of energy to turn off a single thyristor while the second capacitor 111 needs to be dimensioned to store somewhat more energy than the coil 70 at cell current $I_{DC}$. The first capacitor 110 is therefore typically much smaller than the second capacitor 111. The commutation circuit 10 of FIG. 4 further comprises a seventh auxiliary switch 210, an eighth auxiliary switch 220 and a ninth auxiliary switch 230. All the main switches 30, 40, 50, 60 and the auxiliary switches 210, 220, 230, 240 are thyristors.

At an initial state of the commutation circuit 10 the coil current $I_L$ flows in a positive direction 290 and is equal with the cell current $I_{DC}$. The objective of a first commutation is to reverse the coil current $I_L$ to flow in a negative direction 300. At a first phase of the first commutation the seventh auxiliary switch 210 is turned on. As a consequence, the positively pre-charged first terminal 115 is brought into contact with the second input terminal 95, and the second main switch 40 is automatically turned off as a negative voltage is applied over it and the switch current is brought to zero. The discharge of the first capacitor 110 continues until it changes polarity, at which instant the eighth auxiliary switch 220 is turned on. The cell current $I_{DC}$ continues to charge the first and the second capacitors 110, 111 in parallel. The duration of this charging can be controlled such that an appropriate amount of energy is available in the first capacitor 110 for completing the commutation.

At a second phase of the first commutation the fourth main switch 60 is turned on, and resonance between the coil 70 and the first and second capacitors 110, 111 begins. The coil current $I_L$ decreases to zero as the first and second capacitors 110, 111 eventually store all the energy of the resonance circuit, and the seventh and eighth auxiliary switches 210, 220 turn off automatically. The fourth terminal 118 and the second terminal 116 both retain a positive polarity at the end of this process, which polarity of the second terminal 116 will be utilized during a subsequent second commutation.

At a third phase of the first commutation the ninth auxiliary switch 230 is turned on, and the coil current $I_L$ starts to increase in the negative direction 300 and eventually becomes equal with the cell current $I_{DC}$. As this occurs the first main switch 30 is automatically turned off, and the cell current $I_{DC}$ continues to charge the second capacitor 111 with a positive polarity on the third terminal 117. As soon as the voltage over the second capacitor 111 changes polarity the third main switch 50 is turned on, which results in the ninth auxiliary switch 230 being automatically turned off. The objective of the first commutation is now reached, and the second commutation can be carried out when desired. The voltage stored in the first capacitor 110 has a positive polarity on the second terminal 116, while the voltage stored in the second capacitor 111 is close to zero. The objective of the second commutation is to reverse the coil current $I_L$ again to flow in the positive direction 290.

At a first phase of the second commutation the tenth auxiliary switch 240 is turned on. The positive polarity on the second terminal 116 applies a negative voltage over the third main switch 50 which automatically turns off as the switch current is brought to zero. The discharge of the first capacitor 110 continues until it changes polarity, at which instant the ninth auxiliary switch 230 is turned on causing the cell current $I_{DC}$ to charge the first and second capacitors 110, 111 in parallel. The duration of this charging can be controlled such that an appropriate amount of energy is available in the first capacitor 110 for completing the commutation.

At a second phase of the second commutation the first main switch 30 is turned on, and the first and second capacitors 110, 111 now form a resonance circuit together with the coil 70. The ninth and tenth auxiliary switches 230, 240 turn off automatically as the coil current $I_L$ reaches zero. The first capacitor 110 is thereby left with a positive polarity on the first terminal 115, and the second capacitor 111 with a positive polarity on the third terminal 117. The cell at this phase is short circuited through the first and fourth main switches 30, 60, and the coil current $I_L$ is zero.

At a third phase of the second commutation the eighth auxiliary switch 220 is turned on. The coil current $I_L$ starts to increase in the positive direction 290 and eventually becomes equal with the cell current $I_{DC}$. As this occurs the fourth main switch 60 is automatically turned off, and as soon as the voltage over the second capacitor 111 changes polarity the second main switch 40 is turned on. This causes the eighth auxiliary switch 220 to be automatically turned off. The objective of the second commutation is now reached, and a next commutation can be carried out when desired as the first capacitor 110 is already pre-charged with the same polarity as initially.

A great advantage of the embodiment according to FIG. 4 in comparison with that of FIG. 3 is that a separate pre-charge circuit 200 is not needed. Instead, the commutation circuit 10 of FIG. 4 utilizes the cell current $I_{DC}$ for pre-charging the first and second capacitors 110, 111.

Figure 5:
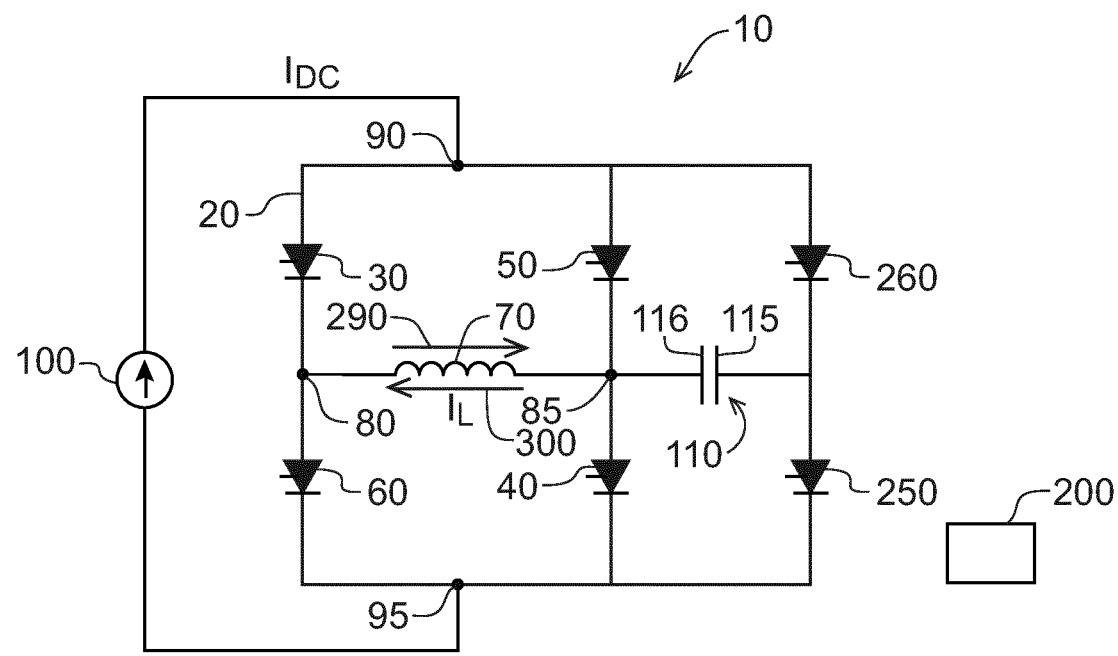
FIG. 5 shows a commutation circuit according to one embodiment of the invention.

Referring to FIG. 5, according to one embodiment of the invention the commutation circuit 10 comprises a voltage source in the form of a capacitor 110 connected either between the second output terminal 85 and the second input terminal 95 or between the second output terminal 85 and the first input terminal 90, depending on the states of an eleventh auxiliary switch 250 and a twelfth auxiliary switch 260. All the main switches 30, 40, 50, 60 and both auxiliary switches 250, 260 are thyristors.

At an initial state of the commutation circuit 10 the coil current $I_L$ flows in a positive direction 290 and is equal with the cell current $I_{DC}$. The capacitor 110 is pre-charged by means of a pre-charge circuit 200 to have a positive polarity on the first terminal 115. The pre-charge energy needs to be just enough to turn off a single thyristor. Because according to the embodiment of FIG. 5 the capacitor 110 needs to be dimensioned to store somewhat more energy than the coil 70 at cell current $I_{DC}$, the pre-charged energy is only a fraction of the capacitor's 110 capacitance. The objective of the commutation is to reverse the coil current $I_L$ to flow in a negative direction 300.

At a first phase of the commutation the eleventh auxiliary switch 250 is turned on. As a consequence, the second main switch 40 is automatically turned off as a negative voltage is applied over it and the switch current is brought to zero, and the coil current $I_L$ starts charging the capacitor 110 with a positive polarity on the second terminal 116. This charging of the capacitor 110 is allowed to continue to store a desired amount of energy in the capacitor 110. At a second phase of the commutation the fourth main switch 60 is turned on, and the cell is thus short circuited through the first and fourth main switches 30, 60. The capacitor 110 now forms a resonance circuit together with the coil 70, and the coil current $I_L$ decreases to zero as the capacitor 110 eventually stores all the energy of the resonance circuit. As this occurs the eleventh auxiliary switch 250 is automatically turned off. At this moment the capacitor 110 should contain enough energy to carry through the following phases of the commutation i.e. somewhat more than the energy of the coil 70 at cell current $I_{DC}$.

At a third phase of the commutation the twelfth auxiliary switch 260 is turned on, and a resonance circuit between the capacitor 110 and the coil 70 is again formed. The coil current $I_L$ starts to increase in the negative direction 300 and eventually becomes equal with the cell current $I_{DC}$. As this occurs the first main switch 30 is automatically turned off, and as soon as the voltage over the capacitor 110 changes polarity the third main switch 50 is turned on and the twelfth auxiliary switch 260 is automatically turned off. The objective of the commutation is now reached, and a next commutation can be carried out in a corresponding manner as the commutation just described. The capacitor 110 needs to be pre-charged with an opposite polarity than initially before the next commutation can be carried out, and the next commutation is initiated by turning on the twelfth auxiliary switch 260.

Figure 6:
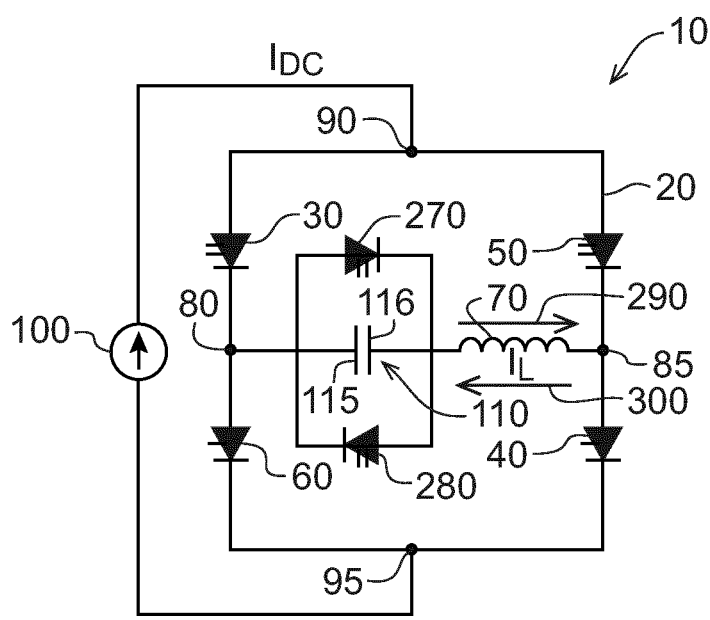
FIG. 6 shows a commutation circuit according to one embodiment of the invention.

Referring to FIG. 6, according to one embodiment of the invention the commutation circuit 10 comprises a voltage source in the form of a capacitor 110 connected in series with the coil 70. A thirteenth auxiliary switch 270 and a fourteenth auxiliary switch 280 are connected in parallel with the capacitor 110, the two auxiliary switches 270, 280 being anti-parallel in relation to each other. The first and third main switches 30, 50 and both auxiliary switches 270, 280 are GTOs, and the second and fourth main switches 40, 60 are thyristors.

At an initial state of the commutation circuit 10 the coil current $I_L$ flows in a positive direction 290 and is equal with the cell current $I_{DC}$. The thirteenth auxiliary switch 270 is turned on and the capacitor 110 is thus bypassed and has a zero voltage. The objective of the commutation is to reverse the coil current $I_L$ to flow in a negative direction 300.

At a first phase of the commutation the thirteenth auxiliary switch 270 is turned off, and the fourth main switch 60 is simultaneously turned on. As a consequence, the cell is short circuited through the first and fourth main switches 30, 60. The capacitor 110 now forms a resonance circuit together with the coil 70, and the coil current $I_L$ decreases to zero as the capacitor 110 eventually stores all the energy of the resonance circuit. As this occurs the second main switch 40 is automatically turned off.

At a second phase of the commutation the third main switch 50 is turned on, and a resonance circuit between the capacitor 110 and the coil 70 is again formed. The coil current $I_L$ starts to increase in the negative direction 300 and eventually becomes close to equal with the cell current $I_{DC}$. In a lossless circuit the coil current $I_L$ in the negative direction 300 could indeed become equal with the cell current $I_{DC}$, and in a circuit with low losses the coil current $I_L$ in the negative direction 300 could become high enough to automatically turn off the first main switch 30 should it be a thyristor. However, according to the embodiment of FIG. 6 the first main switch 30 is a GTO, and it is actively turned off as soon as the voltage over the capacitor 110 changes polarity and the switch current through the first main switch 30 becomes close to zero.

At a third phase of the commutation the fourteenth auxiliary switch 280 is turned on simultaneously with the turning off of the first main switch 30. This will bypass the capacitor 110 now that the coil current $I_L$ flows in the negative direction 300. The objective of the commutation is now reached, and the commutation circuit 10 is at a state that is identical with the initial state except the fact that the coil current $I_L$ flows in the negative direction 300. A next commutation can now be carried out in a corresponding manner as the commutation just described.

Further referring to FIG. 6, an alternative mode of operating the commutation circuit 10 is suggested. Instead of simultaneously turning off the thirteenth auxiliary switch 270 and turning on the fourth main switch 60 at the first phase of the commutation, the thirteenth auxiliary switch 270 is turned off first. The cell current $I_{DC}$ will now charge the capacitor 110 with extra energy which can be utilized later for compensating losses within the circuit. After an appropriate delay the fourth main switch 60 is turned on and the following commutation phases occur as described hereinbefore. The advantage of charging the capacitor 110 with extra energy is that the capacitor 110 now contains enough energy to increase the coil current $I_L$ to be equal with the cell current $I_{DC}$. Consequently, the first main switch 30 in the form of a GTO can be replaced with a thyristor and the commutation will still succeed. The same applies to the third main switch 50 when a corresponding delay is introduced when turning on the second main switch 40 during commutation in an opposite direction.

The commutation circuits 10 described herein can be utilized in controlling coil currents $I_L$ in coils of an electrical machine, such as a transformer, an electrical motor or a generator. In such applications the voltage generated by an electromotive force (emf) between the first and second output terminals 80, 85 of the H bridge 20, as well as losses (electrical energy transformed into heat or mechanical energy), shall be taken into consideration when dimensioning the components and when operating the respective commutation circuit 10.

Figure 7:
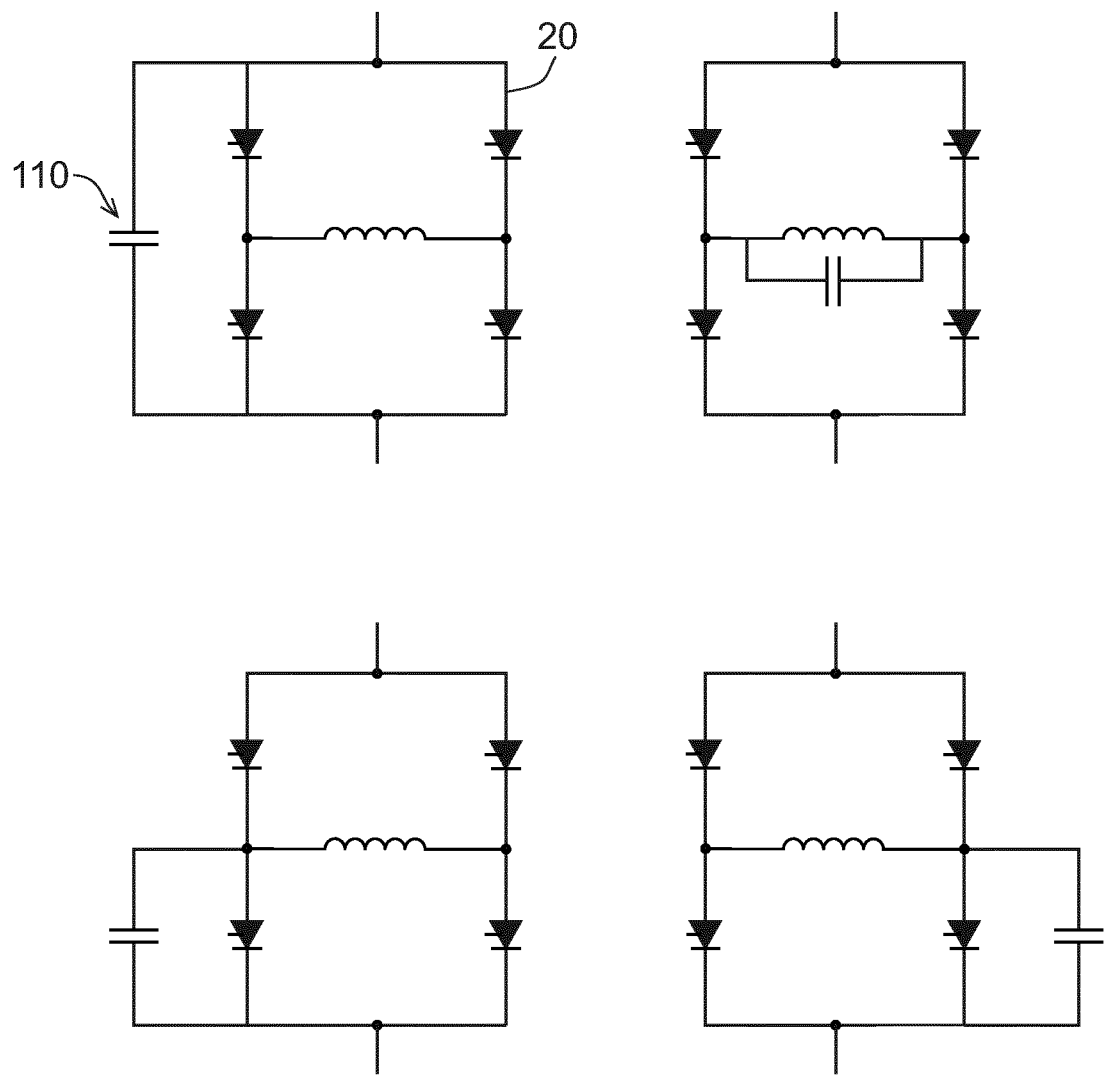
FIG. 7 shows four positions to which a voltage source can be connected in relation to an H bridge at different phases of a commutation.

The invention is not limited to the embodiments shown above, but the person skilled in the art may modify them in a plurality of ways within the scope of the invention as defined by the claims. Thus, numerous other topologies than those disclosed above can be utilized to achieve the technical effect of the invention i.e. to decrease a switch current through a desired main switch 30, 40, 50, 60 in a leading state. FIG. 7 shows four positions to which the voltage source (here in the form of a capacitor 110) can be connected in relation to the H bridge 20 at different phases of the commutation. Furthermore, the current source 100 may be replaced with any suitable source that generates current to the coil 70, such as a voltage source in series with an inductance. Such source shall in the context of the present invention be considered as a current source 100.

In order for the commutation to work as described when using the disclosed topologies it needs to be assumed that the capacitors, the switches, eventual pre-charge circuits and other components are appropriately dimensioned and that the switches are appropriately controlled. Instead of using capacitors as voltage sources according to the embodiments shown above any other suitable voltage sources can be used. Furthermore, any current generated by a voltage source shall be considered as a bypass current if it results in a decrease of a switch current through at least one of the main switches 30, 40, 50, 60, even if the respective current not necessarily bypasses the respective switch. Even if all the embodiments shown above contain at least one thyristor as a main switch 30, 40, 50, 60, the invention can also be applied on commutation circuits 10 where none of the main switches 30, 40, 50, 60 is a thyristor.

The invention claimed is:
1. A commutation circuit comprising:
   a coil connected to an H bridge, the H bridge comprising four main switches for reversing polarity and a resulting coil current in the coil,
   a voltage source configured to generate a bypass current, and at least one auxiliary switch for controlling the bypass current to thereby decrease a switch current through at least one of the main switches,
   wherein the commutation circuit is configured to decrease the switch current through at least one of the main switches without turning on any of the remaining main switches.

2. The commutation circuit according to claim 1, wherein the voltage source is configured to generate a bypass current to thereby bring the switch current to zero.

3. The commutation circuit according to claim 2, wherein the voltage source comprises a capacitor.

4. The commutation circuit according to claim 2, wherein at least one of the main switches comprises a thyristor.

5. The commutation circuit according to claim 1, wherein the voltage source comprises a capacitor.

6. The commutation circuit according to claim 5, wherein the coil current at least partially results from a cell current generated by a current source, and the cell current is furthermore used to pre-charge the capacitor.

7. The commutation circuit according to claim 6, wherein at least one of the main switches comprises a thyristor.

8. The commutation circuit according to claim 5, wherein at least one of the main switches comprises a thyristor.

9. The commutation circuit according to claim 1, wherein at least one of the main switches comprises a thyristor.

10. The commutation circuit according to claim 1, wherein all the main switches are thyristors.

11. The commutation circuit according to claim 1, wherein all the auxiliary switches are thyristors.

12. The commutation circuit according to claim 1, wherein the voltage source is connected in parallel with at least one of the main switches.

13. The commutation circuit according to claim 1, wherein the voltage source is connected in series with the coil.

14. An electrical machine comprising a commutation circuit, which includes:
a coil connected to an H bridge, the H bridge comprising four main switches for reversing polarity and a resulting coil current in the coil,
a voltage source configured to generate a bypass current, and
at least one auxiliary switch for controlling the bypass current to thereby decrease a switch current through at least one of the main switches,
wherein the commutation circuit is configured to decrease the switch current through at least one of the main switches without turning on any of the remaining main switches.

15. A method for reversing a current direction in a coil, the method comprising the steps of:
providing a coil connected to an H bridge, the H bridge comprising four main switches; and
generating a bypass current and controlling it to thereby decrease a switch current through at least one of the main switches without turning on any of the remaining main switches.

16. The method according to claim 15, wherein the bypass current is configured to bring the switch current to zero.

17. The method according to claim 16, wherein the bypass current is generated by means of a capacitor.

18. The method according to claim 15, wherein the bypass current is generated by means of a capacitor.

19. The method according to claim 18, wherein the method further comprises the steps of:
providing a current source for feeding the coil with a cell current; and
pre-charging the capacitor with the cell current.

* * * * *